United States Patent [19]

Anderson

[11] Patent Number: 4,574,858

[45] Date of Patent: * Mar. 11, 1986

[54] TIRE CHAIN DEVICE

[76] Inventor: Alan M. Anderson, 701 N. Shore Dr., Hastings, Nebr. 68901

[*] Notice: The portion of the term of this patent subsequent to Nov. 6, 2001 has been disclaimed.

[21] Appl. No.: 614,316

[22] Filed: May 25, 1984

Related U.S. Application Data

[63] Continuation-in-part of Ser. No. 498,458, May 26, 1983, Pat. No. 4,480,673.

[51] Int. Cl.[4] .......................... B60C 27/06; G09F 7/00
[52] U.S. Cl. .......................................... 152/216; 24/24; 40/591; 116/63 T; 152/219; 152/241; 152/242
[58] Field of Search ............... 152/208, 216, 217, 218, 152/219, 231, 239, 241, 242, 240, 213 R, 213 A, 220; 116/63 P, 63 T, 28 R; 24/21, 23 R, 24, 68 CT, 69 TT; 59/84, 85, 93; 40/591

[56] References Cited

U.S. PATENT DOCUMENTS 3,934,541  1/1976  May et al. ...................... 116/63 T
4,403,565  9/1983  Bleiweiss et al. ................ 116/63 T
4,480,673 11/1984  Anderson ......................... 152/216

Primary Examiner—Edward Kimlin
Assistant Examiner—Thomas Bokan
Attorney, Agent, or Firm—E. Robert Newaman

[57] ABSTRACT

A tire chain device of the type which has a rigid structure positioned on the inner side of the wheel upon which it is installed, said rigid structure being comprised of an adjustable length horizontal strap and two rigid depending straps pivoted from either end thereof in a manner that restricts pivoting more than 90°, the two ends of the horizontal strap of said inner structure being connected by two short cross links to an adjustable length outer strap, and the lower end of each depending strap being removably connected by two long cross links to a plurality of posts having expanded ends spaced along the exposed side of the outer strap. In another mode of the invention the inner structure is comprised of five rigid straps including four of equal length and shape pivotally depending from one horizontal strap such that they form five sides of an octagon when pivoted to their maximum outward extent. The second mode of the device adjusts to different size wheels by the repositioning of the depending straps at their pivot points on the horizontal strap. The outer strap is slotted near one end for vertical support of the inner structure in the formation of a warning triangle.

11 Claims, 9 Drawing Figures

TIRE CHAIN DEVICE

This application is a continuation-in-part of application Ser. No. 498,458, filed May 26, 1983, now U.S. Pat. No. 4,480,673.

TECHNICAL FIELD

The present invention related generally to non-skid devices for tires, more commonly known as tire chains. More particularly the invention is related to tire chains comprised of one or more rigid members which serve the purpose of speeding up the installation of the tire chains, preempting any advantage in jacking up the vehicle and reducing the number of required cross links.

BACKGROUND ART

The following table includes a representative list of patents issued for tire chains which fall within the particular category of the present invention:

| U.S. Pat. No. | Patentee | Date Issued |
| --- | --- | --- |
| 2,176,631 | Kinkle | October 17, 1939 |
| 2,326,618 | Carlson, et al. | August 10, 1943 |
| 2,450,042 | Harold | September 28, 1948 |
| 2,657,728 | Jackson | November 3, 1953 |
| 2,711,770 | Conoscente, et al | June 28, 1955 |
| 2,714,913 | Behnke | August 9, 1955 |
| 2,735,472 | Beery | February 21, 1956 |
| 2,820,502 | Spencer | January 21, 1958 |
| 2,918,960 | McGuinness | December 29, 1959 |
| 2,996,094 | McGuinness | August 15, 1961 |
| 3,106,949 | Timmons | October 16, 1963 |
| 3,856,069 | Giannone | December 24, 1974 |

Most of these inventions disclose rigid structure to be positioned on the inner side of the wheel for reducing the amount of manual activity required in that area. In one mode of this invention this end is better accomplished primarily through the application of a principal not found in the prior art. That principal is to position the structure on the inner side of the wheel by moving it in a somewhat horizontal direction from the rear of the wheel, as opposed to moving the rigid structure over the top of the wheel. To make this maneuver possible, a portion of the rigid structure is adapted to be pivoted upwardly before initiating the positioning maneuver and then to be pivoted downwardly after it has passed over the vehicle axle.

Installation from the rear is simpler and faster for several reasons. It can be substantially accomplished with one arm by gripping the portion of the rigid structure which does not pass over the axle, and there is generally more working space within most modern fenders behind the tire.

Of the patents listed above only U.S. Pat. No. 2,450,042 to Harold discloses structure which might be suitable for installation from the rear.

In a second mode of the invention rigid structure may also be positioned on the inner side of the wheel by moving it over the top of the wheel as in most of the prior art. Accomplishing this maneuver in such manner is made easier by some slight departures from the first mode.

DISCLOSURE OF THE INVENTION

To accomplish the aforesaid, a tire chain device is provided which comprises a rigid structure for positioning on the inner side of the wheel, in the form of an inverted letter "U", of which each leg is comprised of one or more segments which may pivot only inwardly from the inverted "U" shape. A cross link connects each upper bend of the inverted "U" to a rigid strap to be horizontally positioned on the outer side of the wheel.

In the first mode of the invention, the "U" is formed from one horizontal and two vertical straps, and two longer cross links connect each extremity of the depending legs of the "U" to posts affixed to the face of the second horizontal strap positioned on the outer side of the wheel. Both depending legs are pivoted in order that the device may be used on either the left or right side of the vehicle and the entire structure can be more fully collapsed for storage.

In the second mode of the invention the inverted "U" is formed from five pivoted straps having a maximum outward orientation to that of five sides of an equiangular octagon. In addition, two longer cross links connect each extremity of the depending legs of the "U" to the horizontal strap positioned on the outer side of the wheel through elongated flexible shafts with hooked ends. The free ends of these longer cross links are then connected to each other by means of a chain tightener.

An additional advantage of the present invention over the prior art is that its unique structure is suited to provide for adjustment to fit a large variety of tire sizes, both as to diameter and width. Another feature of the present invention is that each tire chain device may be formed into the shape of a warning triangle which will stand substantially vertically. One may be placed behind and one in front of a parked vehicle.

Another advantage of the invention is that the principle of using tire chain devices for warning triangles can be applied to other tire chain devices having similarly sized rigid members.

In addition to these advantages, it is an object of this invention to provide a tire chain device comprised of both rigid portions and chain portions which may be installed on tires of varying sizes without leaving any of the end portions of the chain links dangling free.

A further object of the invention is the provision of a tire chain device including rigid straps, most of which can be standard in size, shape, and design.

These and other objects, advantages, and novel features of the present invention will become apparent from the following detailed description of the invention when considered in conjunction with the accompanying drawings.

BEST MODES FOR CARRYING OUT THE INVENTION

Figure 1:
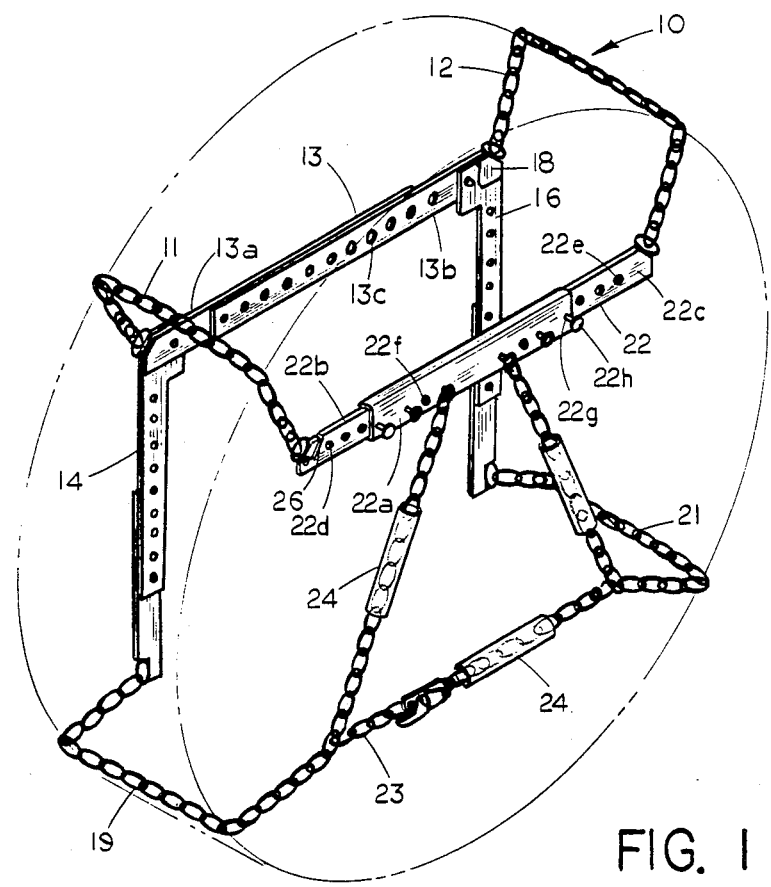
FIG. 1 is a perspective view of the tire chain device of the present invention shown in its installed conformation on a tire whose outline is depicted in phantom lines.

Referring now to the drawings, whereon like reference numerals designate identical or corresponding parts throughout the several views, and more particularly to FIG. 1, whereon the present invention is designated generally at 10. Short cross links 11 and 12 (see also FIS. 2, 3, and 4) are positioned substantially atop either upper quarter of the tire. One end link of cross link 11 is connected to an upper corner of adjustable strap 13 and one end of cross link 12 is connected to the other upper corner of adjustable trap 13. Adjustable strap 13 is comprised of two segments, 13a and 13b, each having a plurality of evenly spaced apart, identically threaded holes 13c. Segments 13a and 13b are affixed to each other to permit the length of strap 13 to be adjusted by means of two allen screws which have a length approximately equal to the total thickness of segments 13a and 13b, and which are threaded for use in holes 13c.

Figure 3:
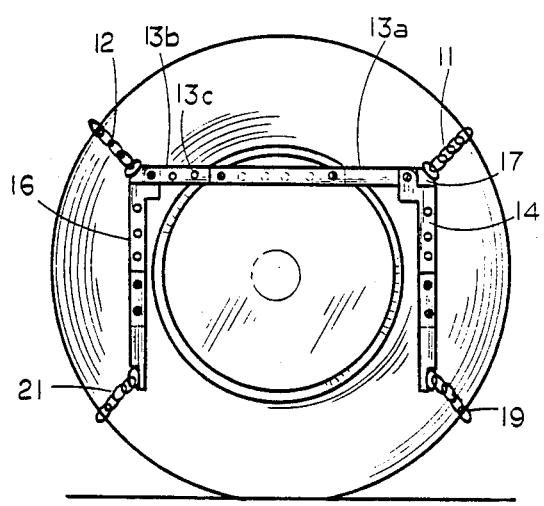
FIG. 3 is a reduced view of the inner side of a tire on which the tire chain device is installed.

Adjustable depending strap 14 is pivotally attached to one end of strap 13 and its counterpart, adjustable depending strap 16, is pivotally attached to the other end of strap 13. (See FIGS. 3 and 4 also). As can best be seen in FIG. 4, the upper end of straps 14 and 16 jog inwardly with respect to strap 13. Flat, substantially square projecting surfaces 17 and 18 of strap 13, in conjunction with the inward jogs of straps 14 and 16, respectively, (as best seen on FIG. 1) serve to limit the angular relationship between depending straps 14 and 16 and strap 13 to approximately 90° or less. The upper corner of each strap 14 and 16 which is adjacent to each projecting surface 17 and 18, respectively, is curved slightly to permit it to pivot adjacent thereto. As can be seen in the accompanying drawings, depending straps 14 and 16 have provisions for adjusting their lengths comparable in nature to those of strap 13. One end of long cross link 19 is connected to the free end of depending strap 14 and one end of long cross link 21 is connected to the free end of depending strap 16. Straps 13, 14, and 16 are positioned on the inner side of the wheel after the tire chain device is installed. The relative length of short cross links 11 and 12 and of long cross links 19 and 21 will be better understood after outer adjustable strap 22 is hereinafter described and the method of installing tire chain device 10 is hereinafter set forth.

Figure 2:
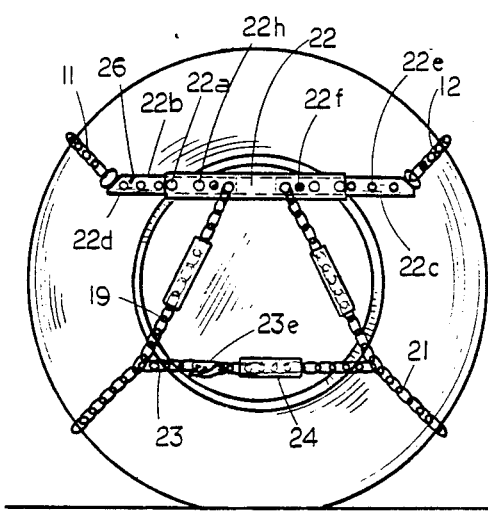
FIG. 2 is a reduced view of the outer side of a tire on which the tire chain device is installed.

Outer adjustable strap 22 is comprised of a central segment 22a having a hollow rectangular cross-section, and two end segments 22b and 22c which have cross-sections sized to slide within center segment 22a. End segments 22b and 22c have a plurality of evenly spaced identically threaded holes 22d and 22e, respectively, (also see FIGS. 2 and 4). Symmetrically positioned upon one of the two vertical portions of center segment 22a are two holes 22f. They are threaded to cooperate with holes 22d and 22e. The overall length of outer strap 22 may be adjusted by repositioning end segments 22b and 22c within center segment 22a by means of two cooperatively threaded allen screws having a length approximately equal to the combined thickness of end segments 22b and 22c and the portion of center segment 22a having holes 22f. Ordinarily outer strap 22 and inner strap 13 will be adjusted to substantially the same length and the center segment 22a will be maintained in a centered position within outer strap 22.

Straps 14 and 16 will be adjusted to a length which is about two-thirds to three-fourths that of strap 13 or outer strap 22. The relative lengths of all of these rigid elements may be adjusted to comport with the diameter and width of the particular tire on which they are usually installed. The reason for the relative lengths of the various rigid elements of tire chain device 10 and the center position of segment 22a of outer strap 22 will be understood after its method of installation is set forth hereinbelow. Also a plurality of evenly spaced apart posts 22g having expanded ends 22h project from the same side of segment 22a in which holes 22f are located.

The end of short cross link 11 which is not connected to strap 13 is connected to an upper corner of outer strap 22 and the end of short cross link 12 which is not connected to strap 13 is connected to the other upper corner of strap 22. When straps 13, 14, and 16 have been positioned around the axle of the vehicle on the inner side of the wheel in a manner which will be explained hereinafter and cross links 11 and 12 are positioned substantially atop the tire, outer strap 22 will rest against the outer side of the tire at a location approximately opposite that of strap 13 on the inner side of the tire. The length of cross links 11 and 12 is such that straps 13 and 22 will rest approximately midway between the center of the tire and its circumference when in this position. Then when long cross links 19 and 21 are pulled around the lower two quarters of the tire from where they are connected at the lower ends of depending straps 14 and 16, respectively, they can be pulled tight across the outer side of the wheel towards center segment 22a and the end link of each slipped over each of two spaced apart posts 22g on center segment 22a and retained thereon by expanded ends 22h.

Figure 4:
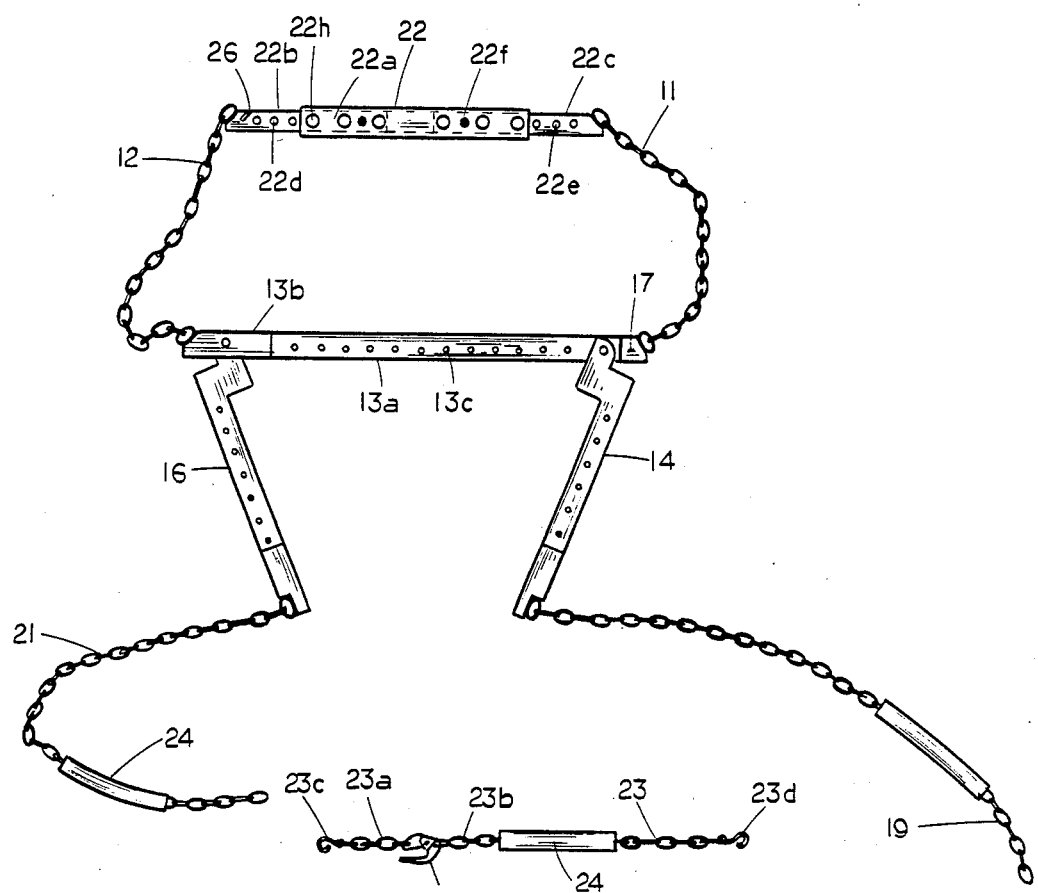
FIG. 4 is a view of the parts of the tire chain device shown spread out on a horizontal surface before installation.

As best disclosed in FIG. 4, tightener chain 23 is comprised of two halves, 23a and 23b. There is a hook 23c connected at one end of tightener half 23a and a hook 23d is placed within an opposite link on long cross link 21. A conventional chain coupler 23e can then be closed to complete the installation of tire chain device 10 on the wheel.

The length of long cross links 19 and 21 is such that a tight installation of tire chain device 10 is possible on tires varying widely in size. Although not shown in the accompanying drawings, for smaller tires it is possible to cross long cross links 19 and 21 below center segment 22a and place the last links thereof on posts 22g oppositely located on center segment 22a. Of course it is presumed that the lengths of straps 13, 14, 16, and 22 have been adjusted to comport with whatever tire or range of tire sizes tire chain 10 will be installed on.

Having explained the method of completing the installation once straps 13, 14, 16, and 22 are substantially in place on the tire, I will now explain that part of the installation necessary to so position these straps. First, the length of the straps are adjusted to accommodate the particular size of tire upon which installation is to be made. If the installation is to be on the right rear tire, strap 16 is pivoted upwardly until its lower portion can be grasped along with strap 13 and depending strap 14 in the installer's left hand. Strap 22 is grasped in his right hand and all straps along with cross links 11 and 12 are slid from behind the tire over its top as a unit. After cross links 11 and 12 are each resting approximately across the middle of one of the two upper quarters of the tire and strap 13 and strap 22 are approximately horizontal and opposite each other on either side of the tire, strap 16 is dropped and permitted to pivot downwardly along the other side of the vehicle axle from which the installer is positioned. It is then a simple matter for the installer to, either or both, temporarily hold the entire inner structure at an angle or to move it further away from himself in order to avoid having strap 16 become hung up on the vehicle axle. Once strap 16 is hanging vertically, the position of the inner structure can be adjusted such that strap 13 and strap 22 are hanging horizontally from cross links 11 and 12 approximately opposite each other on either side of the tire. Cross link 121 is long enough that it can be reached from off of the ground in front of the tire. The remaining steps in installing tire chain device 10 are described hereinabove.

Hub cap protectors 24, comprised of short lengths of pliable hollow tubing may be mounted on appropriate portions of cross link 19, cross link 21, and tightener chain 23. Strap 22 will not ordinarily come in contact with the hub cap because it is rigid and will extend between points on the curvature of the tire which are sufficiently outboard from the adjacent portion of the hub cap.

Figure 5:
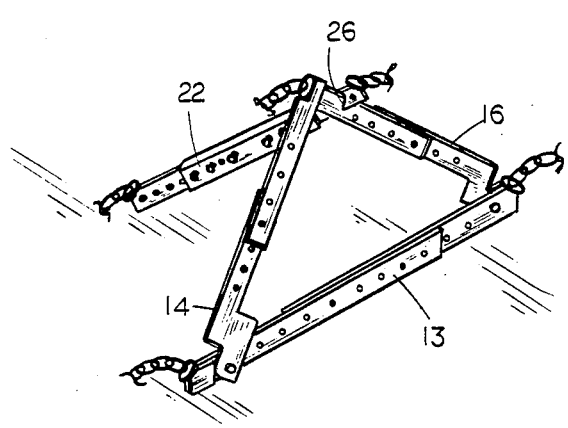
FIG. 5 is a view of the tire chain device of the present invention arranged to form a warning triangle.

To serve as a warning triangle the inner structure comprised of strap 13, 14, and 16 is first set on the ground upside down with respect to its installed orientation. Next, depending straps 14 and 16 are pivoted inwardly, approximately 45 degrees, until their ends come in contact. The tip of their ends may be overlapped in order to maintain an isosceles triangular formation by slightly springing the entire structure. End segment 22b of strap 22 has an angled slot 26 (see FIGS. 1, 2, 4, and 5) near one of its ends which fits over the edge of either strap 14 or 16 near the point at which they contact each other. Thus, straps 14, 16, and 22 form a crude tripod as seen in FIG. 5. The exposed faces of straps 13, 14, and 16 may be painted a light-reflective color in order to better serve the triangular warning function. Having two such tire chain devices 10 normally available, it is possible to set up a warning triangle both in front of and behind a stalled vehicle.

Figure 6:
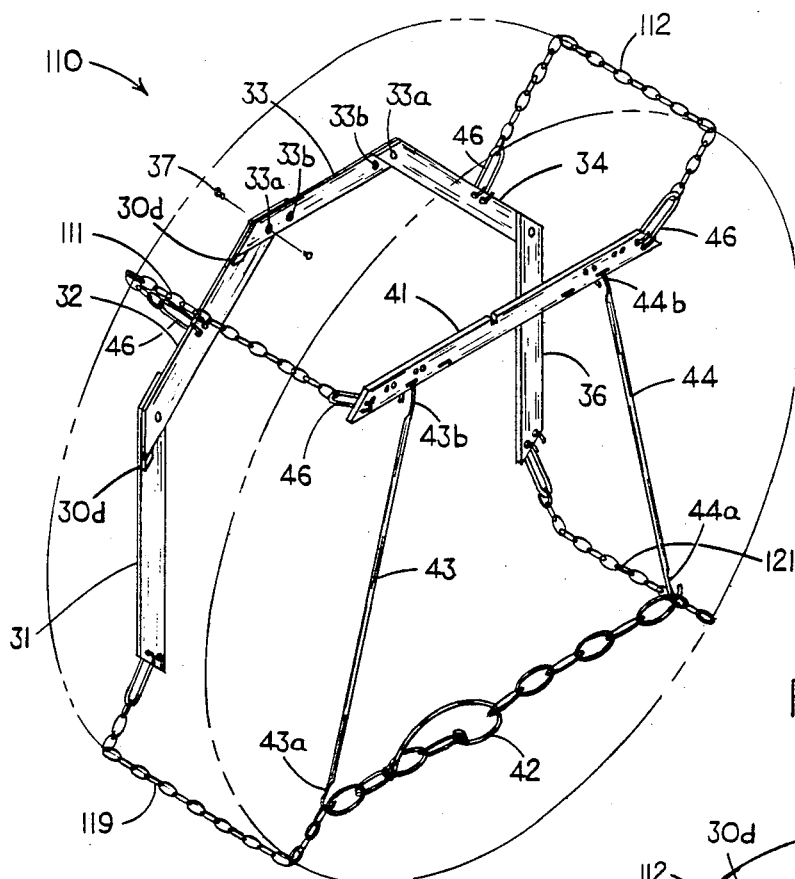
FIG. 6 is a perspective view of an alternate mode of the tire chain device shown in its installed conformation on a tire whose outline is depicted in phantom lines.

Referring now to FIG. 6, whereon another mode of the present invention is designated generally at (110), the inverted "U" formed by straps 13, 14, and 16 of the first mode 10 of my invention is seen to be replaced by five straps 31, 32, 33, 34, and 36. As depending straps 31 and 36 are identical and intermediate straps 32 and 34 are identical, it is only necessary to describe depending strap 31 and intermediate strap 32.

Figure 8:
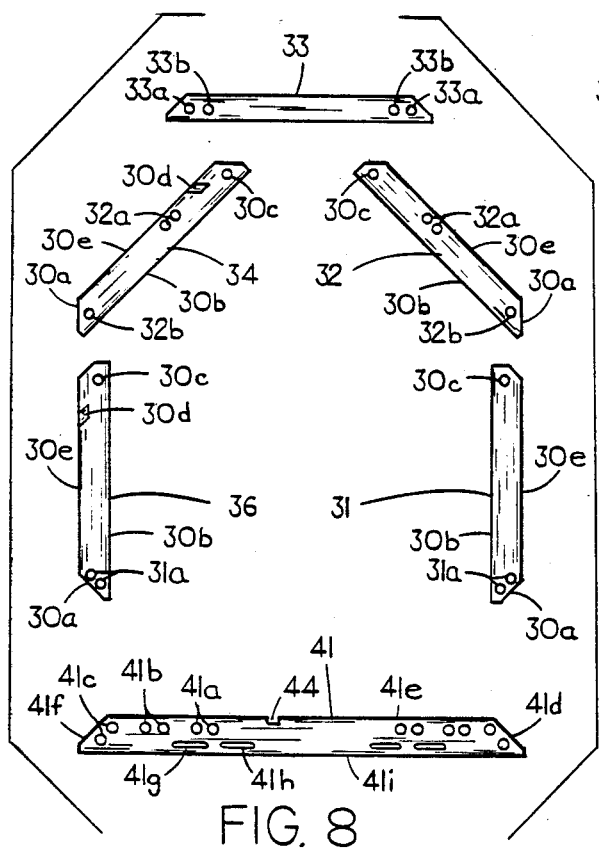
FIG. 8 is a view of the rigid straps of the tire chain device of FIG. 6 shown spread out on a horizontal surface.

Referring now to FIG. 8, whereon straps 31, 32, 33, 34 and 36 are shown laid out end to end as though they were not yet connected, yet were in position to be connected, it may be observed that depending strap 31 in the installed position is upside down with respect to identical strap 36, the same being true of intermediate strap 32 with respect to strap 34. Actually, the only differences between the two depending straps 31 and 36 and the two intermediate straps 32 and 34 are the location and number of certain apertures therein. Therefore, those characteristics of all of said straps which are identical will first be described.

In shape, straps 31, 32, 33, and 36 are substantially rectangular except for the removal of a 45° corner 30a beginning slightly above one longitudinal side 30b on one end. A single aperture 30c is centered at the distal end, said aperture having a stop 30d near the shorter longitudinal side 30e which serves to limit the movement of the adjoining strap which will use said aperture 30c for pivoting attachment thereto. Stops 30d may be created in many ways, such as welding a small piece of metal onto the strap or making a cut in the edge of the strap and raising it slightly. Although the shape of the projection is not important, the location must be such that the pivot of the adjacent pivoted strap is limited to an angle of approximately 135° in order to maintain the inverted "U" shape of straps 31, 32, 33, 34, and 36 essentially over the sidewall area of the tire when the device 110 is installed.

Depending straps 31 and 36 have a pair of double hook receiving apertures 31a in line with and near corner 30a. Intermediate straps 32 and 34 have double hook receiving apertures 32a centrally located with respect to and near short longitudinal side 30e and a single aperture 32b near corner 30a for pivotal attachment at aperture 30c of depending straps 31 and 36, respectively. Although not depicted as such in this mode 100, it is possible for all straps 31, 32, 34, and 36 to have apertures 31a, 32a, and 32b, thus making these four straps completely interchangeable. In addition, outer adjustment strap 41 is of the same shape as inner strap 33, allowing economics in cutting these two straps even though they are of different lengths.

Still referring to FIG. 8, inner adjustment strap 33, is essentially in the shape of an elongated symmetrical trapezoid. It has a pair of spaced apart apertures 33a and 33b along its longitudinal centerline near each end. Intermediate straps 32 and 34 are pivotally attached to adjustment strap 33 at either apertures 33a or 33b, utilizing apertures 30c therein and a removable rivet set 37 of a conventional type which is depicted on FIG. 6. In like manner depending straps 31 and 36 are pivotally connected to intermediate straps 32 and 34, respectively. As should be understood, straps 31, 32, 33, 34, and 36, after being so attached to each other will form an inverted "U" which is collapsible yet outwardly extendable to a maximal shape of that of a partial octagon.

The greater number of straps of mode 110 results in the inverted "U" portion thereof to more closely conform to the sidewall area of the tire. The more circular shape of second mode 110, as compared to first mode 10, allows it to be more easily installed from a point opposite the outer wall of the tire, since it more nearly follows the shape of the tire and overhanging fender. Obviously, curved straps could also be used for this same purpose, as could more than five straps.

Outer strap 41, like strap 33, is in the form of an elongated symmetrical trapezoid. It has three pairs of spaced apart apertures 41a, 41b, and 41c located near its upper edge 41d (in installed orientation) at each end thereof. Apertures 41a and 41b are in line with elongated side 41e and apertures 41c are in line with corners 41f. Two spaced apart horizontal slots 41g and 41h are located near the lowr elongated side 41e of strap 41 at either end thereof.

Referring again to FIG. 6, second mode 110 is depicted as having its various cross links 111, 112, 119 and 121 removable from their corresponding straps. A conventional "U" shaped double hook 46 on either end of links 111 and 112 and on one end of links 119 and 121 is used in conjunction with apertures 30a, 32a, 41a, 41b and 41c for this purpose.

To enhance the versatility of mode 10 links 11, 12, 19, and 21 could be connected in a similar fashion if desired.

Elongated double hooks 43 and 44 have simple hooks at one end for connection to cross links 119 and 121. At their other end they have slot hooks 43b and 44b for connection to slots 41g or 41h, making them completely removable. The shanks 43c and 44c of double hooks 43 and 44 are of a flexible but somewhat rigid material, such as certain types of cable. Thus, many parts of the second mode 110 are interchangeable and relatively few different parts must be manufactured and inventoried.

Second mode 110 of the tire chain device may be easily adjusted to fit various tires, such as those on 13", 14", or 15" wheels, by locating apertures 33a, 33b, 41a, 41b, and 41c appropriately. For instance, intermediate straps 32 and 34 can be attached at both apertures 33a of strap 33 for a 15" wheel, at 33a on one end and 33b on the other end for a 14" wheel, and at both apertures 33b for a 13" wheel. Also, short cross links 111 and 112 are attached at one end to apertures 32a of intermediate straps 32 and 34, respectively, and to one of the pairs of apertures 41a, 41b, or 41c of outer strap 41 at the other end, depending on the wheel size.

Adjustment of the long cross links 119 and 121 is accomplished once inner straps 31, 32, 33, 34, and 36 are in place and the short cross links 111 and 112 have been draped over the top of the tire. The elongated double hooks 43 and 44 are hooked into the appropriate slot 41g or 41h on the outer strap 41, and then hooked into each cross link 119 and 121, respectively, adjacent the outer sidewall of the tire as seen in FIG. 6.

To complete the installation of the second mode 110 of the invention, the free end of long cross link 119 is attached to the free end of long cross link 121 using a conventional "S" shaped chain coupler 42. Thus, it can be seen that both modes 10 and 110 of the invention utilize the same basic means of support on the outer face of the tire, although tightener chain 23 is not used in second mode 110 and double hooks 43 and 44 are added.

In second mode 110 the end portions of the long cross links 119 and 121 are of a lighter weight, larger link chain, since they are not under severe wear conditions. First mode 10 may be fitted in the same manner, including tightener chain 23.

Figure 7:
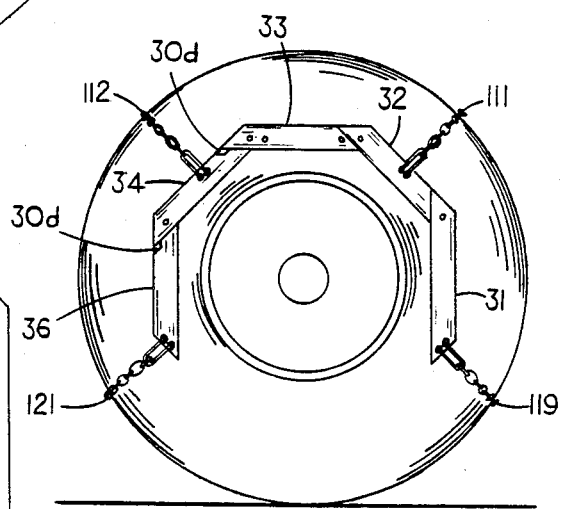
FIG. 7 is a reduced view of the inner side of a tire on which the tire chain device of FIG. 6 is installed.
Figure 9:
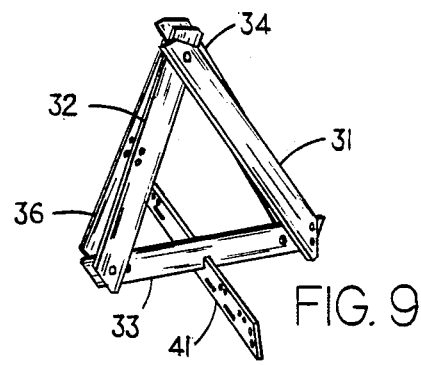
FIG. 9 is a view of the mode of the tire chain device depicted in FIGS. 6, 7, and 8, arranged to form a warning triangle.

Referring now to FIGS. 7 and 9, to serve as a warning triangle, straps 31 and 32 are pivoted inwardly until the free end of strap 31 touches that end of adjustment strap 33 which is connected to strap 34. Then straps 34 and 36 are also pivoted inwardly until positioned substantially behind straps 31 and 32. This creates the general triangular formation of a warning triangle. To hold the triangle in a generally upright position it can be leaned against the car or propped against any convenient object.

Another method of supporting the triangle in an upright position is provided by a notch 44 (see also FIGS. 6 and 8) near the middle of elongated side 41e of outer strap 41. Notch 44 is perpendicular to the longitudinal axis of the strap 41, and is slightly wider than the thickness of straps 31, 32, 33, 34 or 36. That strap which serves as the horizontal base of the triangle is then inserted into notch 44 at the approximate midpoint thereof, notch 44 being deep enough to maintain the triangle in somewhat upright position. Thus, the triangle is free-standing, and can be used as a warning in two directions if both sides have a light-reflective surface.

It is believed that all of the advantages and objects mentioned above are accomplished by use of the best mode for carrying out the invention disclosed herein. Obviously, many modifications and variations of the present invention are possible in light of the above teachings. It is therefore to be understood that, within the scope of the appended claims, the invention may be practiced otherwise than as specifically described.

I claim:

1. A tire chain device, comprising:
   first connecting means connecting an end of each of a first pair of cross links in a spaced apart relationship;
   two second connecting means connecting an end of a second pair of longer cross links to each end of said first connecting means at a point spaced away therefrom, wherein both said first and said second connecting means include a plurality of rigid straps adapted for pivoted attachment end to end, said attachment being limited to place the ends of the first and second connecting means radially outward from the rotational axis of the tire to the extent said ends do not exceed the radial outmost extent of the adjacent sidewall of the tire, said first and two second connecting means adapted for placement on the inside of a wheel; and
   third connecting means connecting the second end of each of the first pair of cross links in spaced apart relationship, said third connecting means having means for removably attaching thereto a link of each of said second pair of cross links, said third connecting means adapted for placement on the outside of the wheel, whereby said first pair of cross links may initially rest atop the wheel while said second pair of cross links may be brought under the wheel and attached to said third connecting means.

2. The tire chain device of claim 1 wherein each of the rigid straps are of the same shape and size, whereby said rigid straps are interchangeable.

3. The tire chain device of claim 1 wherein said first and second connecting means include at least three straps, the adaptation for limited pivoted attachment including a projecting means inboard the pivot point on one end of each of all but one of said straps, said one of said straps being centrally located and having at least one alternate pivot point, whereby the device can be adjusted to fit different size tires.

4. The tire chain device of claim 3 wherein each of the rigid straps having projecting means are identical with respect to size and shape and the location and type of projecting means.

5. The tire chain device of claim 1 wherein said first connecting means and said two second connecting means have means for removably attaching thereto the respective ends of said first pair of cross links and said second pair of cross links.

6. The tire chain device of claim 5 wherein all of said attaching means include hook and eye means.

7. The tire chain device of claim 1 wherein said removable attaching means for each of said second pair of cross links further includes a hook means for receiving a link of one of said pair of second cross links, said hook means having an elongated flexible shaft.

8. The tire chain device of claim 7 wherein each of said hook means includes means for removable attachment to said third connecting means.

9. The tire chain of claim 7 further comprising means for tightly connecting the free ends of the second pair of cross links to each other.

10. The tire chain device of claim 1 wherein said third connecting means is a rigid strap having a slot in its longitudinal edge for receiving an edge of one rigid strap of said first and two second connecting means, whereby said third connecting means can support the first and two second connecting means in the form of a somewhat vertically oriented warning triangle.

11. The tire chain device of claim 10 wherein the contiguous faces of each of said first and two second connecting means are painted a light-reflective warning color.

* * * * *